United States Patent
Panna et al.

(10) Patent No.: US 8,707,107 B1
(45) Date of Patent: Apr. 22, 2014

(54) SYSTEMS AND METHODS FOR PROACTIVELY FACILITATING RESTORATION OF POTENTIAL DATA FAILURES

(75) Inventors: Arindam Panna, Maharashtra (IN); Nilesh Dhakras, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 194 days.

(21) Appl. No.: 13/316,014

(22) Filed: Dec. 9, 2011

(51) Int. Cl.
 *G06F 11/00* (2006.01)

(52) U.S. Cl.
 USPC ............. 714/47.1; 714/1; 714/2; 714/6.1; 714/16; 714/20; 714/25; 714/30

(58) Field of Classification Search
 USPC ............. 714/47.1, 1, 2, 6, 16, 20, 25, 30
 See application file for complete search history.

(56) References Cited

U.S. PATENT DOCUMENTS

| | | | | |
|---|---|---|---|---|
| 4,516,216 A * | 5/1985 | Armstrong | ............... | 709/224 |
| 5,181,207 A * | 1/1993 | Chapman | ............... | 714/755 |
| 6,711,670 B1 * | 3/2004 | Soltis et al. | ............... | 712/216 |
| 7,321,992 B1 * | 1/2008 | Vellore et al. | ............... | 714/47.1 |
| 7,330,325 B2 * | 2/2008 | Vacar et al. | ............... | 360/69 |
| 7,337,353 B2 * | 2/2008 | Yamamoto et al. | ............... | 714/47.2 |
| 7,349,823 B2 * | 3/2008 | Whisnant et al. | ............... | 702/181 |
| 7,409,586 B1 * | 8/2008 | Bezbaruah et al. | ............... | 714/13 |
| 7,457,916 B2 * | 11/2008 | Suzuki et al. | ............... | 711/114 |
| 7,523,149 B1 * | 4/2009 | Sridharan et al. | ............... | 1/1 |
| 7,542,877 B2 * | 6/2009 | Nakamura | ............... | 702/185 |
| 7,590,737 B1 * | 9/2009 | Chen et al. | ............... | 709/226 |
| 7,603,583 B2 * | 10/2009 | Yamamoto et al. | ............... | 714/6.32 |
| 7,676,702 B2 * | 3/2010 | Basham et al. | ............... | 714/47.1 |
| 7,831,788 B1 * | 11/2010 | Ohr et al. | ............... | 711/162 |
| 7,885,923 B1 * | 2/2011 | Tawri et al. | ............... | 707/610 |
| 8,170,991 B1 * | 5/2012 | Dhakras et al. | ............... | 707/640 |
| 8,397,039 B2 * | 3/2013 | Dhakras et al. | ............... | 711/162 |
| 8,423,832 B2 * | 4/2013 | Riedlinger et al. | ............... | 714/37 |
| 2004/0153728 A1 * | 8/2004 | Suzuki et al. | ............... | 714/6 |
| 2008/0282128 A1 * | 11/2008 | Lee et al. | ............... | 714/755 |
| 2009/0070539 A1 * | 3/2009 | Haustein et al. | ............... | 711/162 |
| 2011/0055620 A1 * | 3/2011 | Sengupta | ............... | 714/2 |
| 2012/0226957 A1 * | 9/2012 | Fukutomi et al. | ............... | 714/758 |
| 2013/0091391 A1 * | 4/2013 | Arndt et al. | ............... | 714/47.1 |

* cited by examiner

*Primary Examiner* — John J Tabone, Jr.
(74) *Attorney, Agent, or Firm* — ALG Intellectual Property, LLC (57) ABSTRACT

A computer-implemented method may include monitoring a computing system for evidence of potential data failures within the computing system. The computer-implemented method may also include detecting evidence that indicates a potential data failure while monitoring the computing system and identifying data implicated in the potential data failure based on the detected evidence. The computer-implemented method may further include initiating an action configured to proactively facilitate restoration of at least a portion of the data implicated in the potential data failure prior to determining whether the data implicated in the potential data failure needs to be restored. Various other methods, systems, and computer-readable media are also disclosed.

20 Claims, 6 Drawing Sheets

Event Log
400

| TYPE | DATE | TIME | SOURCE | EVENT ID |
|---|---|---|---|---|
| Error | 11/13/2011 | 4:14:10 PM | MICROSOFT WORD | 100 |
| Error | 11/13/2011 | 4:14:10 PM | MICROSOFT WORD | 100 |
| Error | 11/13/2011 | 4:14:10 PM | MICROSOFT WORD | 100 |
| Error | 11/13/2011 | 4:14:09 PM | MICROSOFT WORD | 100 |
| Error | 11/13/2011 | 4:14:09 PM | MICROSOFT WORD | 100 |
| Error | 11/13/2011 | 4:14:09 PM | MICROSOFT WORD | 100 |
| Information | 11/13/2011 | 4:08:11 PM | SYMANTEC ANTIVIRUS | 7 |
| Information | 11/13/2011 | 3:56:11 PM | CI | 4137 |
| Information | 11/13/2011 | 3:56:09 PM | CI | 4137 |
| Information | 11/13/2011 | 3:55:11 PM | IPOD SERVICE | 0 |
| Information | 11/13/2011 | 3:55:01 PM | ESENT | 302 |
| Information | 11/13/2011 | 3:55:00 PM | ESENT | 301 |
| Information | 11/13/2011 | 3:54:59 PM | ESENT | 300 |
| Information | 11/13/2011 | 3:54:58 PM | ESENT | 102 |
| Information | 11/13/2011 | 3:55:57 PM | ESENT | 100 |
| Warning | 11/13/2011 | 3:55:57 PM | CI SERVICE | 4132 |
| Information | 11/13/2011 | 3:55:11 PM | SECURITY CENTER | 0 |
| Information | 11/13/2011 | 3:55:05 PM | WINDOWS SEARCH SERVICE | 1003 |

SYSTEMS AND METHODS FOR PROACTIVELY FACILITATING RESTORATION OF POTENTIAL DATA FAILURES

BACKGROUND

In today's world of vast computing technology, many technology users are concerned with protecting the integrity and reliability of data stored on their computing systems. In an effort to address such concerns, some users may configure their computing systems to utilize backup and restore technologies capable of facilitating restoration of data that has become corrupt or unusable. For example, a user may configure a laptop computer to back up various onboard data to a remote backup service accessible via the Internet. In this example, by backing up the onboard data to the remote backup service, the laptop computer may ensure that a backup copy of the data is always available in the event that the onboard data becomes corrupt and needs to be restored.

However, while existing backup and restore technologies may facilitate restoration of data that has become corrupt or unusable, such backup and restore technologies may also suffer from one or more shortcomings and/or inefficiencies that have a negative impact on user experience. For example, after determining that at least a portion of the onboard data has become corrupt or unusable, the user's laptop computer may initiate a restore process configured to restore a backup copy of the data from the remote backup service to the laptop computer via the Internet. Unfortunately, since the laptop computer initiated this restore process only after determining that the data has become corrupt or unusable, this restore process may result in significant delays that inhibit the user's access to the data.

What is needed, therefore, is a mechanism that reduces the amount of time needed to restore data by proactively facilitating restoration of the data prior to determining whether the data has actually become corrupt or unusable.

SUMMARY

As will be described in greater detail below, the instant disclosure generally relates to systems and methods for proactively facilitating restoration of potential data failures by initiating actions configured to restore data implicated in the potential data failures prior to determining whether the data actually needs to be restored. In one example, a computer-implemented method for proactively facilitating restoration of potential data failures may include (1) monitoring a computing system for evidence of potential data failures within the computing system, (2) detecting, while monitoring the computing system, evidence that indicates a potential data failure within the computing system, (3) identifying data implicated in the potential data failure based on the detected evidence, and then (4) initiating, prior to determining whether the data implicated in the potential data failure needs to be restored, an action configured to proactively facilitate restoration of at least a portion of the data implicated in the potential data failure in response to the detected evidence.

Examples of this action include, without limitation, warning a user of the computing system of the potential data failure to enable the user to determine whether to restore the data implicated in the potential data failure, replacing the data implicated in the potential data failure with a backup copy of the data implicated in the potential data failure, enabling a different computing system to access a backup copy of the data implicated in the potential data failure, and/or bringing online a virtual machine that includes a backup copy of the data implicated in the potential data failure.

In some examples, the method may also include identifying an application installed on the computing system and searching the computing system for evidence that indicates data corruption in at least a portion of data accessed by the application. In such examples, the method may further include detecting, while searching the computing system, the evidence that indicates data corruption in the portion of data accessed by the application.

In some examples, the method may also include identifying at least one event log that specifies at least one error detected in the computing system and searching the event log for an error that indicates that the portion of data accessed by the application is potentially corrupt. In such examples, the method may further include identifying, while searching the event log, the error that indicates that the portion of data accessed by the application is potentially corrupt. In various examples, this event log may represent an event log maintained by an operating system installed on the computing system, an event log maintained by the application that accessed the portion of data that is potentially corrupt, or an event log maintained by an administrator of the computing system.

In some examples, the method may also include identifying a file system located on the computing system and detecting at least one failed attempt to perform an input/output operation on at least a portion of data stored in the file system. In one example, the method may further include using a file system filter driver to (1) access the file system, (2) detect the failed attempt to perform the input/output operation on the portion of data stored in the file system, (3) detect an apparently successful attempt to perform the input/output operation on the portion of data in the file system after detecting the failed attempt to perform the input/output operation, and (4) identify the portion of data stored in the file system based on the input/output operation.

In some examples, the method may also include determining that a backup copy of the data implicated in the potential data failure is stored on a remote computing system and copying the backup copy of the data implicated in the potential data failure from the remote computing system to a local storage location on the computing system. In such examples, the method may further include facilitating replacement of the data implicated in the potential data failure with the backup copy upon determining that the data implicated in the potential data failure is no longer operable for at least one intended purpose of the data.

In some examples, the method may also include identifying a plurality of actions capable of proactively facilitating restoration of the portion of the data implicated in the potential data failure. In such examples, the method may further include identifying at least one of the actions based on the detected evidence and initiating the identified action in response to the detected evidence.

In one embodiment, a system for implementing the above-described method may include a monitoring module programmed to (1) monitor a computing system for evidence of potential data failures within the computing system, (2) detect, while monitoring the computing system, evidence that indicates a potential data failure within the computing system, and (3) identify data implicated in the potential data failure based on the detected evidence. The system may also include a restoration module programmed to initiate, prior to determining whether the data implicated in the potential data failure needs to be restored, an action configured to proactively facilitate restoration of at least a portion of the data implicated in the potential data failure in response to the detected evidence.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) monitor a computing system for evidence of potential data failures within the computing system, (2) detect, while monitoring the computing system, evidence that indicates a potential data failure within the computing system, (3) identify data implicated in the potential data failure based on the detected evidence, and then (4) initiate, prior to determining whether the data implicated in the potential data failure needs to be restored, an action configured to proactively facilitate restoration of at least a portion of the data implicated in the potential data failure in response to the detected evidence.

As will be explained in greater detail below, by proactively facilitating restoration of potential data failures prior to determining whether the data implicated in the potential data failures has actually become corrupt or unusable, the various systems and methods described herein may reduce the amount of time needed to restore the data implicated in the potential data failures. In addition, these systems and methods may prevent potential data failures from affecting certain applications and/or other data that is dependent upon the data implicated in the potential data failures prior to determining whether such data has actually become corrupt or unusable.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for proactively facilitating restoration of potential data failures. The phrase "potential data failure," as used herein, generally refers to any type or form of data loss or data corruption that has already occurred or may possibly occur at a future point in time. In one example, a potential data failure may represent a data failure that has already occurred but has not been definitively identified as a data failure. In another example, a potential data failure may represent a data failure that has not yet occurred but is likely to occur at a future point in time.

In an additional example, a potential data failure may represent a data failure identified by an application that is attempting to access the data implicated in the data failure but is unable to initiate restoration of the data. In a further example, a potential data failure may represent a data failure identified by one system configured to access the data on a logical level but not identified by another system configured to manage the data on a physical level. For example, a potential data failure may represent a data failure identified by an application that is unable to initiate restoration of the data but not identified by a file system that is capable of initiating restoration of the data.

Figure 1:
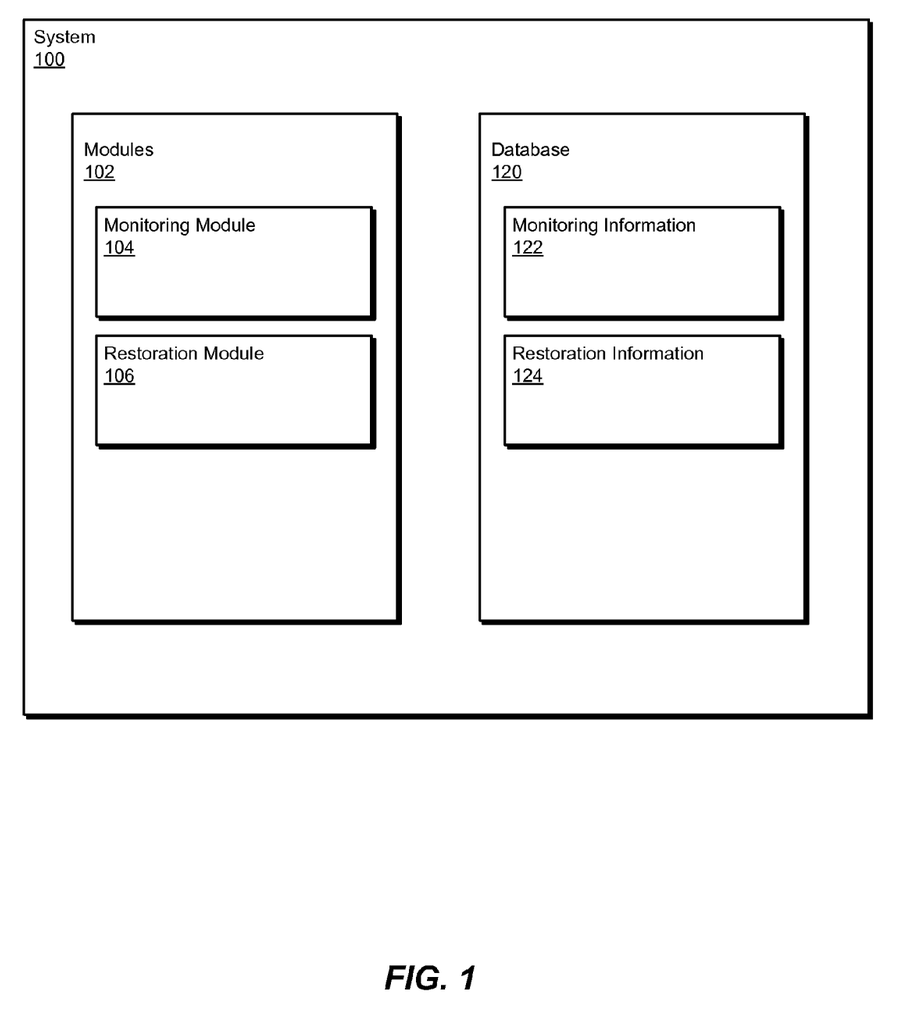
FIG. 1 is a block diagram of an exemplary system for proactively facilitating restoration of potential data failures.
Figure 2:
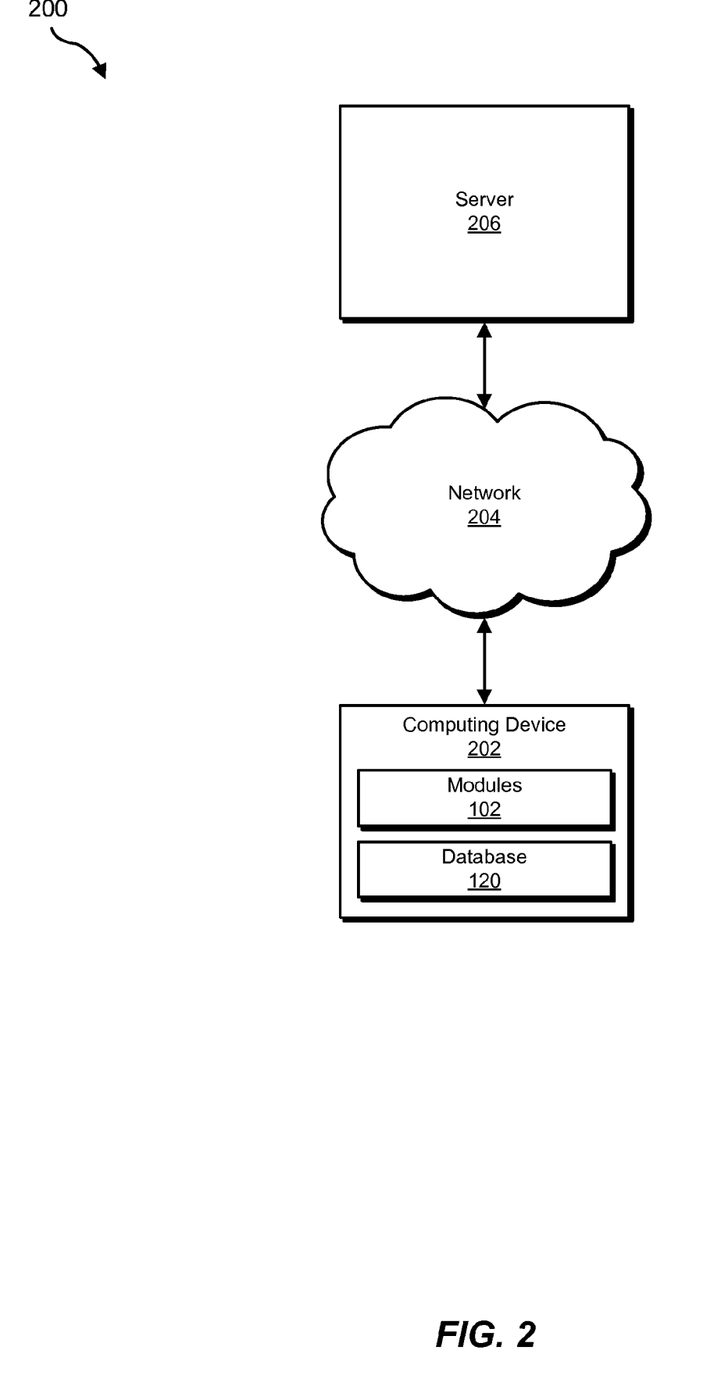
FIG. 2 is a block diagram of an exemplary system for proactively facilitating restoration of potential data failures.

The following will provide, with reference to FIGS. 1-2, detailed descriptions of exemplary systems for proactively facilitating restoration of potential data failures. Detailed descriptions of corresponding computer-implemented methods will be provided in connection with FIG. 3, and detailed descriptions of an exemplary event log will be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for proactively facilitating restoration of potential data failures. As illustrated in this figure, exemplary system 100 may include one or more modules 102 for performing one or more tasks. For example, and as will be explained in greater detail below, exemplary system 100 may include a monitoring module 104 programmed to (1) monitor a computing system for evidence of potential data failures within the computing system, (2) detect, while monitoring the computing system, evidence that indicates a potential data failure within the computing system, and (3) identify data implicated in the potential data failure based on the detected evidence.

In addition, and as will be described in greater detail below, exemplary system 100 may include restoration module 106 programmed to initiate, prior to determining whether the data implicated in the potential data failure needs to be restored, an action configured to proactively facilitate restoration of at least a portion of the data implicated in the potential data failure in response to the detected evidence. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store monitoring information 122 and restoration information 124. As will be described in greater detail below, one or more of modules 102 may use at least a portion of the information stored in database 120 to proactively facilitate restoration of potential data failures.

Monitoring information 122 generally represents any type or form of information related to monitoring a computing system for evidence of potential data failures. Examples of monitoring information 122 include, without limitation, information that identifies at least a portion of a computing system (e.g., at least one file system or event log) to be monitored for evidence of potential data failures, information that identifies one or more types of evidence that indicate potential data failures within a computing system, information that identifies one or more applications configured to access data that may be implicated in potential data failures, and/or any other type or form of suitable monitoring information.

Restoration information 124 generally represents any type or form of information related to restoring data implicated in potential data failures. Examples of restoration information 124 include, without limitation, information that identifies at least one action configured to proactively facilitate restoration of at least a portion of data implicated in a potential data failure, information that identifies at least one backup system that stores a backup copy of data implicated in a potential data failure, information that identifies a storage location in which a backup copy of data implicated in a potential data failure is currently stored, information that identifies a storage location that stores data implicated in a potential data failure, and/or any other type or form of suitable restoration information.

Database 120 may represent portions of a single database or computing device or a plurality of databases or computing devices. For example, database 120 may represent a portion of computing device 202 and/or server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204.

In one embodiment, one or more of modules 102 from FIG. 1 may, when executed by at least one processor of computing device 202, enable computing device 202 to proactively facilitate restoration of potential data failures. For example, and as will be described in greater detail below, one or more of modules 102 may cause computing device 202 to (1) monitor one or more portions of computing device 202 for evidence of potential data failures within computing device 202, (2) detect, while monitoring the portions of computing device 202, evidence that indicates a potential data failure within computing device 202, (3) identify data implicated in the potential data failure based on the detected evidence, and then (4) initiate, prior to determining whether the data implicated in the potential data failure needs to be restored, an action configured to proactively facilitate restoration of at least a portion of the data implicated in the potential data failure (e.g., from server 206) in response to the detected evidence.

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Server 206 generally represents any type or form of computing device that is capable of backing up data stored on another computing device and/or restoring data to another computing device. Examples of server 206 include, without limitation, backup servers, application servers, web servers, database servers, deduplication storage devices, one or more portions of "the cloud," and/or any other suitable servers. In addition, Server 206 may be configured to provide various backup services, application services, web services, database services, data deduplication services, cloud computing services, and/or any other suitable services.

Network 204 generally represents any medium or architecture capable of facilitating communication or data transfer. Examples of network 204 include, without limitation, an intranet, a wide area network (WAN), a local area network (LAN), a storage area network (SAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202 and server 206.

Figure 3:
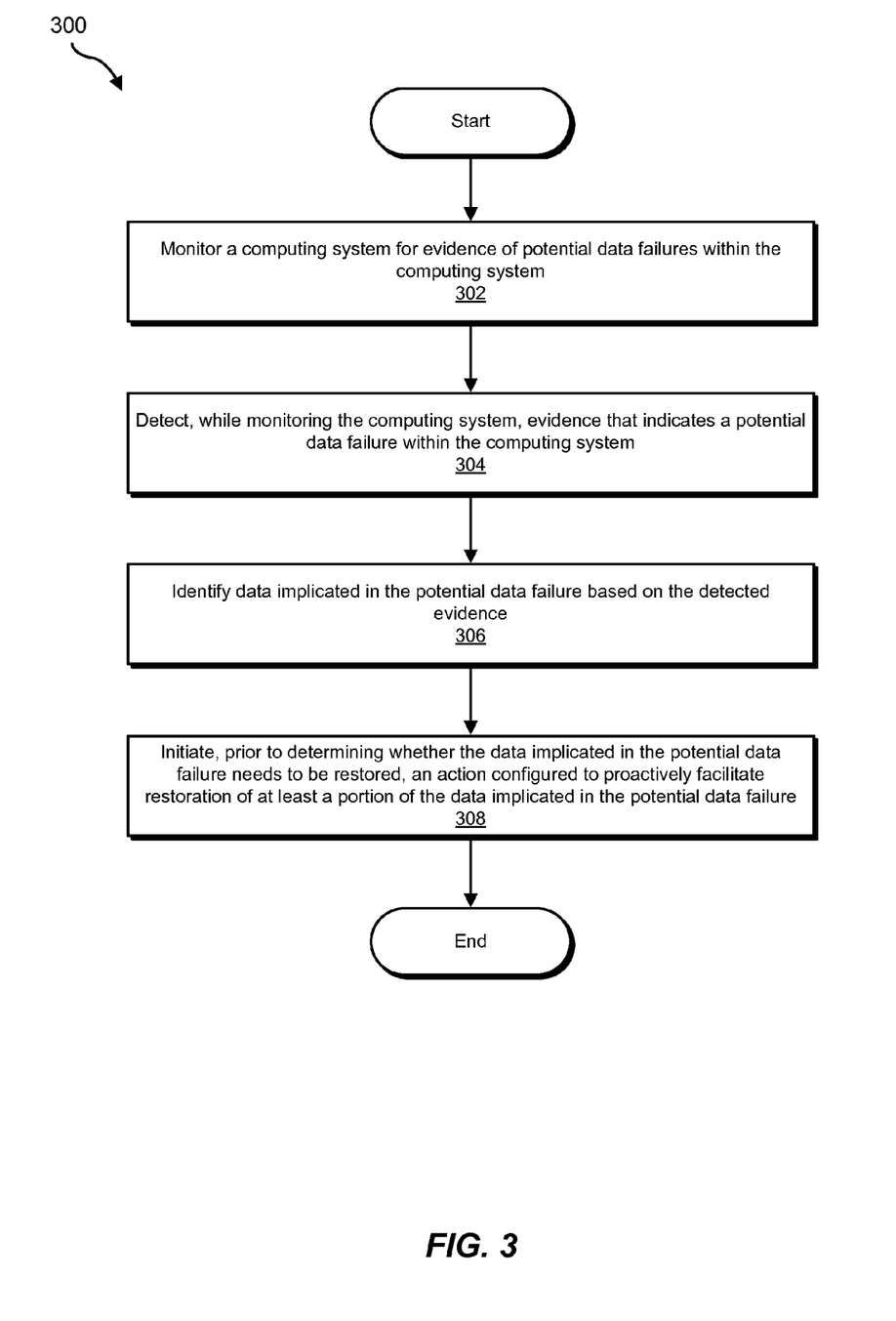
FIG. 3 is a flow diagram of an exemplary method for proactively facilitating restoration of potential data failures.

FIG. 3 is a flow diagram of an exemplary computer-implemented method 300 for proactively facilitating restoration of potential data failures. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated at step 302 in FIG. 3, one or more of the various systems described herein may monitor a computing system for evidence of potential data failures within the computing system. For example, monitoring module 104 may, as part of computing device 202, monitor one or more portions of computing device 202 for evidence of potential data failures within computing device 202. The term "evidence," as used herein, generally refers to any type or form of information that indicates or suggests that a data failure has already occurred or may possibly occur at a future point in time.

The systems described herein may perform step 302 in a variety of ways. In some examples, monitoring module 104 may be configured to search for evidence that indicates data corruption in at least a portion of data accessed by an application installed on computing device 202. This application may include any type or form of software application installed on computing device 202. Examples of such an application include, without limitation, any type of business software (such as one or more portions of MICROSOFT OFFICE or OPENOFFICE.ORG), any type of communication software (such as MICROSOFT OUTLOOK, AOL INSTANT MESSENGER, or GOOGLE CHROME), any type of computer programming software (such as EMACS, JEDIT, or BBEDIT), any type of gaming software (such as MICROSOFT FLIGHT SIMULATOR or a SONY PLAYSTATION emulator), any type of antivirus software (such as SYMANTEC'S NORTON ANTIVIRUS or MCAFEE TOTAL PROTECTION), any type of software module integrated in an operating system (such as BONJOUR or WINDOWS CALCULATOR), any type of server software (such as MICROSOFT EXCHANGE or MICROSOFT SQL), and/or any other type or form of suitable application.

In one example, monitoring module 104 may identify a MICROSOFT EXCHANGE application installed on computing device 202 and monitor various activities of the MICROSOFT EXCHANGE application in an attempt to identify evidence of data corruption within computing device 202. For example, monitoring module 104 may search for evidence that at least a portion of data accessed by the MICROSOFT EXCHANGE application has become corrupt or may possibly become corrupt at a future point in time. In this example, and as will be described in greater detail below, monitoring module 104 may search at least one event log (such as event log 400 in FIG. 4) that maintains at least a partial record of the MICROSOFT EXCHANGE application's activities on computing device 202.

The event log searched by monitoring module 104 may represent any type or form of publishing mechanism configured to record information about the application's activities. In some examples, monitoring module 104 may search an event log maintained by an operating system installed on the computing device 202. This operating system may represent any type or form of operating system installed on computing device 202. Examples of such an operating system include, without limitation, any version or variant of MICROSOFT WINDOWS, any version or variant of WINDOWS MOBILE, any version or variant of MAC OS, any version or variant of APPLE'S IOS, any version or variant of LINUX, any version or variant of UNIX, any version or variant of DOS, any version or variant of AMIGAOS, any version or variant of GOOGLE CHROME OS, any version or variant of GOOGLE'S ANDROID, any version or variant of SOLARIS, any version or variant of GNU, and/or any other type or form of suitable operating system.

In some examples, the operating system may be configured to record information about the application's activities in an event log. For example, a MICROSOFT WINDOWS operating system installed on computing device 202 may record information about the MICROSOFT EXCHANGE application's activities in an event log. In one example, this event log maintained by the MICROSOFT WINDOWS operating system may include only information about the MICROSOFT EXCHANGE application. Monitoring module 104 may search this event log specific to the MICROSOFT EXCHANGE application for evidence that at least a portion of data accessed by the MICROSOFT EXCHANGE application has become corrupt or may possibly become corrupt at a future point in time.

In another example, the event log maintained by the MICROSOFT WINDOWS operating system may also include information about activities of one or more other applications besides the MICROSOFT EXCHANGE application. For example, the MICROSOFT WINDOWS operating system may record information about the MICROSOFT EXCHANGE application's activities in WINDOWS EVENT LOG (a proprietary event log maintained by the MICROSOFT WINDOWS operating system). In this example, in addition to information about the MICROSOFT EXCHANGE application's activities, WINDOWS EVENT LOG may include information about activities of various other applications that interface with the MICROSOFT WINDOWS operating system installed on computing device 202. Monitoring module 104 may periodically search WINDOWS EVENT LOG for evidence that at least a portion of data accessed by the MICROSOFT EXCHANGE application has become corrupt or may possibly become corrupt at a future point in time.

In other examples, monitoring module 104 may search an event log maintained by the MICROSOFT EXCHANGE application itself. For example, the MICROSOFT EXCHANGE application may be configured to record information about the MICROSOFT EXCHANGE application's own activities in an event log. In this example, the MICROSOFT EXCHANGE application may identify a storage location within computing device 202 and store this event log at the identified storage location within computing device 202. Monitoring module 104 may periodically search this event log specific to the MICROSOFT EXCHANGE application for evidence that at least a portion of data accessed by the MICROSOFT EXCHANGE application has become corrupt or may possibly become corrupt at a future point in time.

In additional examples, monitoring module 104 may search an event log maintained by an administrator of computing device 202. For example, the MICROSOFT WINDOWS operating system installed on computing device 202 may generate a dialog box that identifies at least a portion of the MICROSOFT EXCHANGE application's activities, including at least one error resulting from an attempt by the MICROSOFT EXCHANGE application to access data stored on computing device 202. In this example, the MICROSOFT WINDOWS operating system may direct computing device 202 to provide the dialog box for visual presentation to the administrator of computing device 202.

Upon viewing the dialog box, the administrator may manually record information about the MICROSOFT EXCHANGE application's activities, including the error resulting from the attempt to access data stored on computing device 202, in an event log maintained by the administrator. Monitoring module 104 may periodically search this manually maintained event log for evidence that at least a portion of data accessed by the MICROSOFT EXCHANGE application has become corrupt or may possibly become corrupt at a future point in time.

In another example, monitoring module 104 may be configured to monitor at least one file system located on computing device 202 for evidence of potential data failures. This file system may represent any type or form of file system located on or accessible to computing device 202. Examples of such a file system include, without limitation, a File Allocation Table (FAT) file system, a Hierarchical File System (HFS), a UNIX File System (UFS), SUN MICROSYSTEM'S ZFS, a Journaling File System (JFS), a disk file system, a flash file system, a tape file system, a database file system, a transactional file system, a network file system, a shared disk file system, a special file system, a device file system, a virtual file system, and/or any other type of suitable file system.

In one example, monitoring module 104 may include (or engage) a file system filter driver configured to monitor attempts to perform input/output operations on a FAT file system located on computing device 202. In this example, any failed attempts to perform an input/output operation on the FAT file system may indicate a potential data failure within computing device 202. Such input/output operations may include any type or form of operation configured to access data stored in the FAT file system (e.g., a read operation or write operation).

In some examples, monitoring module 104 may identify one or more instructions on how to monitor computing device 202 in monitoring information 122. In one example, monitoring module 104 may analyze monitoring information 122 to identify which event log to search for evidence indicating that at least a portion of data accessed by the MICROSOFT EXCHANGE application is potentially corrupt. In another example, if computing device 202 includes multiple file systems, monitoring module 104 may analyze monitoring information 122 to identify which file system located on computing device 202 to monitor for evidence of potential data failures.

As illustrated at step 304 in FIG. 3, one or more of the various systems described herein may detect, while monitoring the computing system, evidence that indicates a potential data failure within the computing system. For example, monitoring module 104 may, as part of computing device 202, detect evidence that indicates a potential data failure while monitoring computing device 202. In this example, the potential data failure may include any type or form of data loss or data corruption that has already occurred or may possibly occur at a future point in time within computing device 202.

The systems described herein may perform step 304 in a variety of ways. In some examples, while monitoring computing device 202, monitoring module 104 may detect evidence that indicates data corruption in at least a portion of data accessed by an application. For example, while searching the event log that identifies the activities of the MICROSOFT EXCHANGE application, monitoring module 104 may detect one or more errors indicating that at least a portion of data accessed by the MICROSOFT EXCHANGE application is potentially corrupt.

Figure 4:
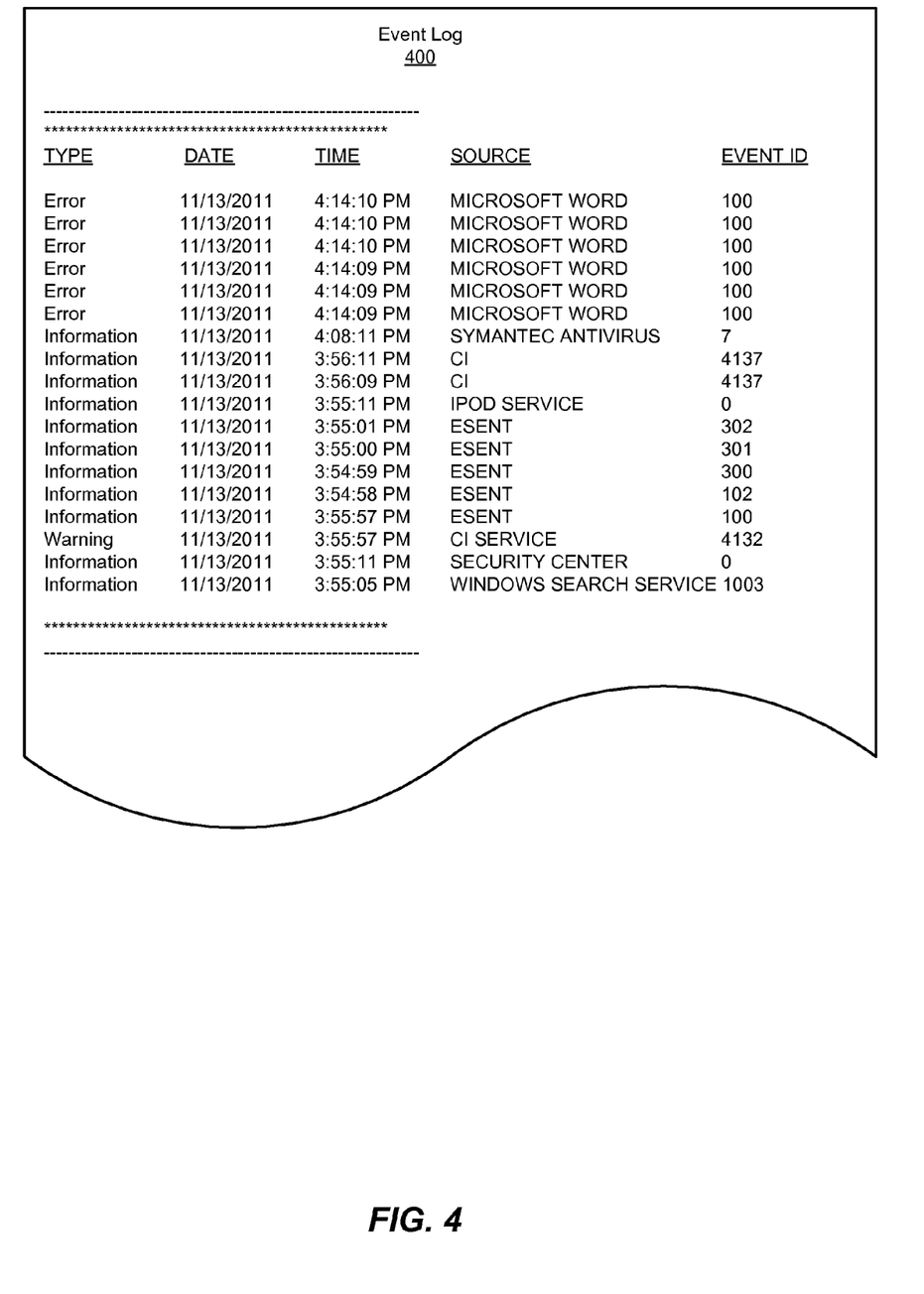
FIG. 4 is an illustration of an exemplary event log capable of being searched for evidence of potential data failures.

FIG. 4 is an illustration of an exemplary event log 400 capable of being searched for evidence of potential data failures within computing device 202. As illustrated in FIG. 4, event log 400 may include information that identifies various activities of various applications installed on computing device 202. In particular, event log 400 may include information that identifies events attempted and/or performed by the applications. For example, event log 400 may include information that identifies, for each event, a type of event (in this example, "TYPE"), a date of the event (in this example, "DATE"), a timestamp of the event, (in this example, "TIME"), an application that attempted and/or performed the event (in this example, "SOURCE"), and an identifier that identifies the event (in this example, "EVENT ID").

In a more specific example, while searching event log 400, monitoring module 104 may detect errors resulting from one or more failed attempts by the MICROSOFT EXCHANGE application to perform the event identified by EVENT ID 100. Monitoring module 104 may access monitoring information 122 to determine whether one or more of the errors detected in event log 400 indicate that at least a portion of data accessed by the MICROSOFT EXCHANGE application is potentially corrupt. For example, monitoring information 122 may include an algorithm for determining, based on the errors detected in event log 400, whether at least a portion of data accessed by the MICROSOFT EXCHANGE application is potentially corrupt. In this example, upon applying the errors detected in event log 400 to this algorithm, monitoring module 104 may determine that at least a portion of data accessed by the MICROSOFT EXCHANGE application is potentially corrupt.

In another example, while monitoring event log 400, monitoring module 104 may determine that the event identified by EVENT ID 100 indicates that the MICROSOFT EXCHANGE application has been behaving irregularly on a logical level. For example, the event identified by EVENT ID 100 may indicate that the MICROSOFT EXCHANGE application provided an unexpected result in response to data that has become corrupt but has not been suspected of being corrupt by a file system that manages the data on a physical level. In this example, the file system that manages the data on a physical level may have accessed the data as part of an input/output operation without detecting any errors resulting from the input/output operation.

In such an example, monitoring module 104 may access monitoring information 122 and identify, within monitoring information 122, a result that the MICROSOFT EXCHANGE application is expected to provide in response to healthy data. Monitoring module 104 may compare the unexpected result provided by the MICROSOFT EXCHANGE application with the expected result identified in monitoring information 122. Monitoring module 104 may then determine, based on this comparison, that the data that caused the MICROSOFT EXCHANGE application to behave irregularly is potentially corrupt.

In such an example, monitoring module 104 may also determine, based on the potentially corrupt data that caused the MICROSOFT EXCHANGE application to behave irregularly, that at least some (if not all) other data accessed by the MICROSOFT EXCHANGE application on a logical level is potentially corrupt. Additionally or alternatively, monitoring module 104 may determine, based on the potentially corrupt data that caused the MICROSOFT EXCHANGE application to behave irregularly, that at least one other application that is dependent upon the MICROSOFT EXCHANGE application may be behaving irregularly as well.

In some examples, while monitoring at least one file system located on computing device 202, monitoring module 104 may detect evidence that indicates data corruption in at least a portion of data stored in the file system. For example, and as mentioned above, monitoring module 104 may use a file system filter driver to monitor a FAT file system located on computing device 202. In this example, while monitoring the FAT file system, the file system filter driver may detect at least one failed attempt to perform an input/output operation (such as a read operation or write operation) on at least a portion of data stored in the file system.

In some examples, the FAT file system may attempt to perform a write operation on a data cluster (or storage location) that has been allocated for storing at least a portion of a file in the FAT file system. In one example, the file system filter driver may determine that the FAT file system's attempt to perform the write operation on the data cluster has failed. For example, monitoring module 104 may direct the file system filter driver to enter into a layer of the operating system that interfaces with the FAT file system. Upon entering this layer of the operating system, the file system filter driver may detect the failed attempt to perform the write operation on the data cluster based on the FAT file system's inability to write to the data cluster.

In another example, in response to the failed attempt to perform the write operation on the data cluster, the FAT file system may mark the data cluster to indicate that the data cluster is defective or malfunctioning. In this example, the FAT file system may also add this data cluster to a list that specifies defective data clusters. Monitoring module 104 may detect the failed attempt to perform the write operation on the data cluster by identifying the data cluster in the list that specifies defective data clusters. Monitoring module 104 may then determine, based on the failed attempt to perform the write operation, that the portion of the file stored in the defective data cluster is potentially corrupt.

In some examples, the FAT file system may attempt to perform a read operation on a data cluster that has been allocated for storing at least a portion of a file. In one example, the file system filter driver may determine that the FAT file system's attempt to perform the read operation on the data cluster has failed. For example, monitoring module 104 may direct the file system filter driver to access the FAT file system via the operating system. Upon accessing the FAT file system via the operating system, the file system filter driver may detect the failed attempt to perform the read operation on the data cluster based on the FAT file system's inability to read the portion of the file stored in the data cluster.

In one example, in response to the failed attempt to perform the read operation on the potentially defective data cluster, the FAT file system may allocate a new data cluster for storing the portion of the file currently stored in the potentially defective data cluster. In this example, the FAT file system may continue attempting to read the portion of the file stored in the potentially defective data cluster to copy this portion of the file from the potentially defective data cluster to the new data cluster. For example, even though the FAT file system's initial attempt to perform the read operation failed, the FAT file system may be able to perform the read operation on the potentially defective data cluster after at least one subsequent attempt.

In such an example, while this subsequent attempt to perform the read operation may appear to have been successful, the portion of the file read from the potentially defective data cluster may represent data that is potentially corrupt. If the FAT file system has been configured to determine that such an apparently successful attempt does not produce corrupt data, the FAT file system may fail to initiate or facilitate restoration of the portion of the file read from the potentially defective data cluster even though this portion of the file represents data that is potentially corrupt. In other words, the FAT file system may overlook evidence that indicates a potential data failure within computing device 202 and, as a result, miss an opportunity to proactively initiate and/or facilitate restoration of any data implicated in the potential data failure.

As illustrated at step 306 in FIG. 3, one or more of the various systems described herein may identify data implicated in the potential data failure based on the detected evidence. For example, monitoring module 104 may, as part of computing device 202, identify data implicated in the potential data failure based on the evidence detected in step 304. In this example, the data implicated in the potential data failure may include any data stored in a data cluster (or storage location) that has been allocated for storing at least a portion of a file on computing device 202.

The systems described herein may perform step 306 in a variety of ways. In some examples, as described above, monitoring module 104 may monitor at least one event log that identifies activities of an application and, while monitoring the event log, detect one or more errors indicating that at least a portion of data accessed by the application is potentially corrupt. In one example, monitoring module 104 may identify metadata associated with the errors detected in the event log. For example, monitoring module 104 may identify metadata that includes additional information about the errors resulting from the MICROSOFT EXCHANGE application's failed attempts to perform the event identified by EVENT ID 100 in FIG. 4.

In this example, the metadata associated with the errors detected in the event log may include information that identifies at least one physical address of a data cluster (or storage location) that stores the data that the MICROSOFT EXCHANGE application was attempting to access at the time of the errors. Monitoring module 104 may search the metadata associated with the errors to identify any physical addresses of data clusters that store data that the MICROSOFT EXCHANGE application was attempting to access at the time of the errors.

In some examples, as also described above, monitoring module 104 may monitor at least one file system located on computing device 202 and detect, while monitoring the file system, at least one failed attempt to perform an input/output operation on at least a portion of data stored in the file system. In one example, monitoring module 104 may use a file system filter driver to identify a data cluster on which the file system was attempting to perform the input/output operation. For example, monitoring module 104 may use the file system filter driver to identify the data cluster on which the FAT file system was attempting to perform the read operation that initially failed. In this example, monitoring module 104 may also use the file system filter driver to identify a physical address of this data cluster based on the read operation.

As illustrated at step 308 in FIG. 3, one or more of the various systems described herein may initiate, prior to determining whether the data implicated in the potential data failure needs to be restored, an action configured to proactively facilitate restoration of at least a portion of the data implicated in the potential data failure. For example, restoration module 106 may, as part of computing device 202, initiate an action configured to proactively facilitate restoration of at least a portion of the data implicated in the potential data failure prior to determining whether the data implicated in the potential data failure is no longer operable for at least one intended purpose of the data. In this example, restoration module 106 may initiate the action configured to proactively facilitate restoration of this portion of data in response to the evidence detected in step 304.

The systems described herein may perform step 308 in a variety of ways. In one example, in response to the detected evidence, restoration module 106 may proactively facilitate restoration of the portion of data implicated in the potential data failure by warning a user of computing device 202 of the potential data failure. For example, restoration module 106 may generate a warning indicating that data accessed by the MICROSOFT EXCHANGE application is potentially corrupt. In this example, restoration module 106 may direct computing device 202 to provide this warning for visual presentation (as, e.g., a dialog box) to the user of computing device 202. Upon viewing the warning, the user of computing device 202 may determine whether to restore the potentially corrupt data accessed by the MICROSOFT EXCHANGE application.

In another example, in response to the detected evidence, restoration module 106 may proactively facilitate restoration of the portion of data implicated in the potential data failure by replacing the data with a backup copy of the data. For example, restoration module 106 may determine that a backup copy of the data accessed by the MICROSOFT EXCHANGE application is stored remotely on server 206. In this example, restoration module 106 may copy the backup copy of the data from server 206 to computing device 202 via network 204.

Upon copying the backup copy of the data, restoration module 106 may replace the potentially corrupt data accessed by the MICROSOFT EXCHANGE application with the backup copy of the data. For example, restoration module 106 may locate the data cluster that includes the potentially corrupt data based on the physical address of the data cluster. In this example, restoration module 106 may delete the potentially corrupt data from the data cluster and restore the backup copy of the data to the data cluster.

Additionally or alternatively, upon obtaining the backup copy of the data, restoration module 106 may store the backup copy of the data in a temporary storage location. For example, restoration module 106 may allocate a new data cluster in computing device 202 for storing the backup copy of the data on a temporary basis. In this example, restoration module 106 may maintain the backup copy of the data in the newly allocated data cluster until determining that the data accessed by the MICROSOFT EXCHANGE application is no longer operable for at least one intended purpose. Upon determining that data accessed by the MICROSOFT EXCHANGE application is no longer operable for at least one intended purpose, restoration module 106 may replace the data with the backup copy of the data stored in the newly allocated data cluster.

In a further example, in response to the detected evidence, restoration module 106 may proactively facilitate restoration of the portion of data implicated in the potential data failure by enabling a different computing system to access a backup copy of the data implicated in the potential data failure. For example, restoration module 106 may direct a different computing system (not illustrated in FIG. 2) to copy the backup copy of the data accessed by the MICROSOFT EXCHANGE application from server 206 to the different computing system. In this example, upon copying the backup copy of the data, the different computing system may use the backup copy of the data accessed by the MICROSOFT EXCHANGE application to perform one or more operations involving such data.

In an additional example, in response to the detected evidence, restoration module 106 may proactively facilitate restoration of the portion of data implicated in the potential data failure by bringing online a virtual machine that includes a backup copy of the data implicated in the potential data failure. For example, restoration module 106 may identify an offline virtual machine capable of being implemented on computing device 202. In this example, restoration module 106 may determine that this offline virtual machine includes a backup copy of the data accessed by the MICROSOFT EXCHANGE application. Upon determining that this offline virtual machine includes a backup copy of the data, restoration module 106 may direct computing device 202 to bring the virtual machine online.

In some examples, restoration module 106 may identify one or more instructions on how to proactively facilitate restoration of the portion of the data implicated in the potential data failure in restoration information 124. For example, restoration module 106 may analyze restoration information 124 to identify which action to initiate to proactively facilitate restoration of the potentially corrupt data accessed by the MICROSOFT EXCHANGE application. In this example, restoration information 124 may identify a plurality of actions capable of proactively facilitating restoration of the potentially corrupt data accessed by the MICROSOFT EXCHANGE application.

In some examples, restoration module 106 may identify the action based on the evidence detected in step 304. In one example, restoration information 124 may indicate that restoration module 106 is to copy the backup copy of the data accessed by the MICROSOFT EXCHANGE application from server 206 if the detected evidence includes at least one error identified in an event log. In another example, restoration information 124 may indicate that restoration module 106 is to warn the user of computing device 202 of the potential data failure if the detected evidence includes at least one failed attempt to perform an input/output operation on at least a portion of data stored in a FAT file system. Upon identifying the action based on the detected evidence, restoration module 106 may initiate the action to proactively facilitate restoration of the portion of data implicated in the potential data failure.

As explained above, by proactively facilitating restoration of potential data failures prior to determining whether the data implicated in the potential data failures has actually become corrupt or unusable, the various systems and methods described herein may reduce the amount of time needed to restore the data implicated in the potential data failures. In addition, these systems and methods may prevent potential data failures from affecting certain applications and/or other data that is dependent upon the data implicated in the potential data failures prior to determining whether such data has actually become corrupt or unusable.

Figure 5:
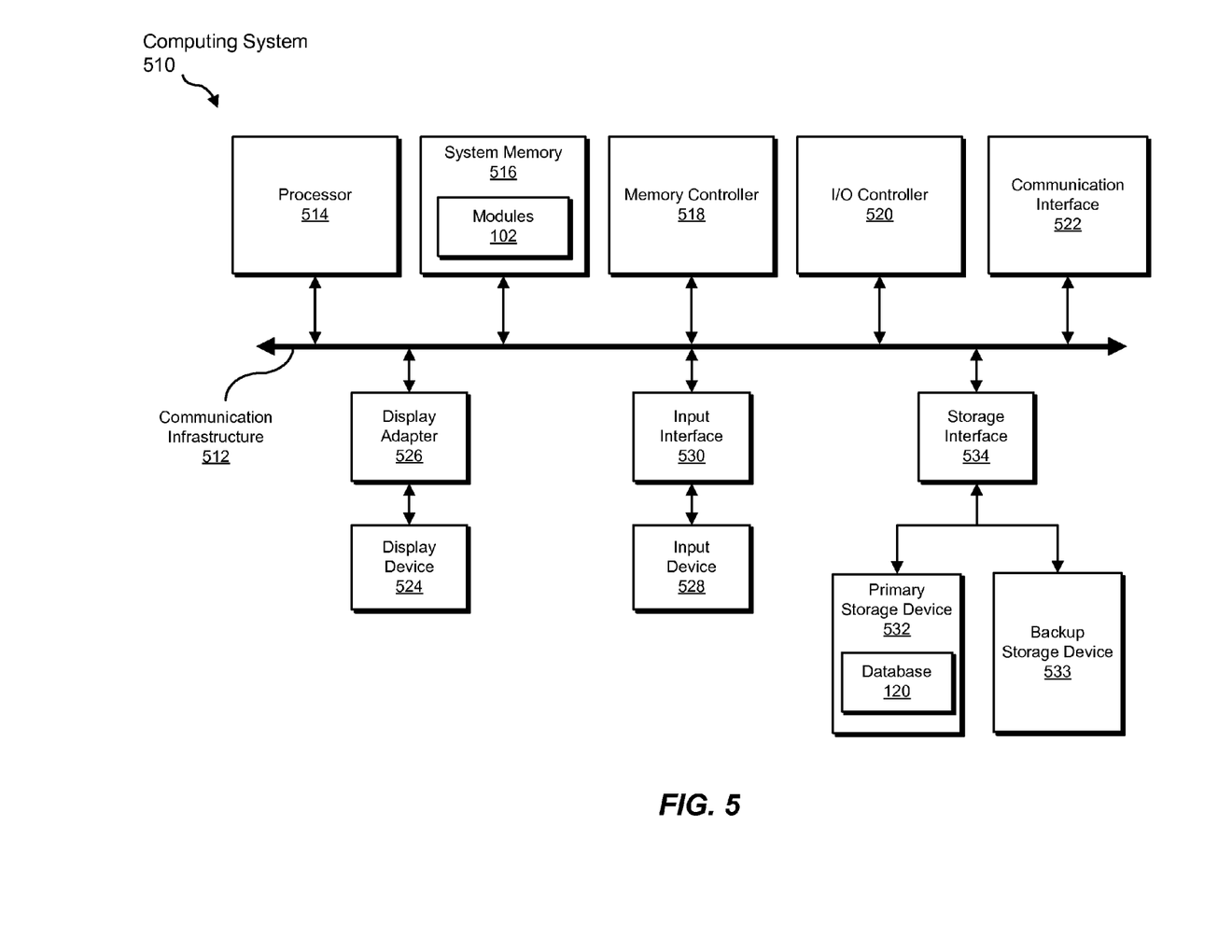
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the monitoring, detecting, identifying, determining, initiating, facilitating, restoring, searching, accessing, warning, enabling, copying, bringing, and replacing steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
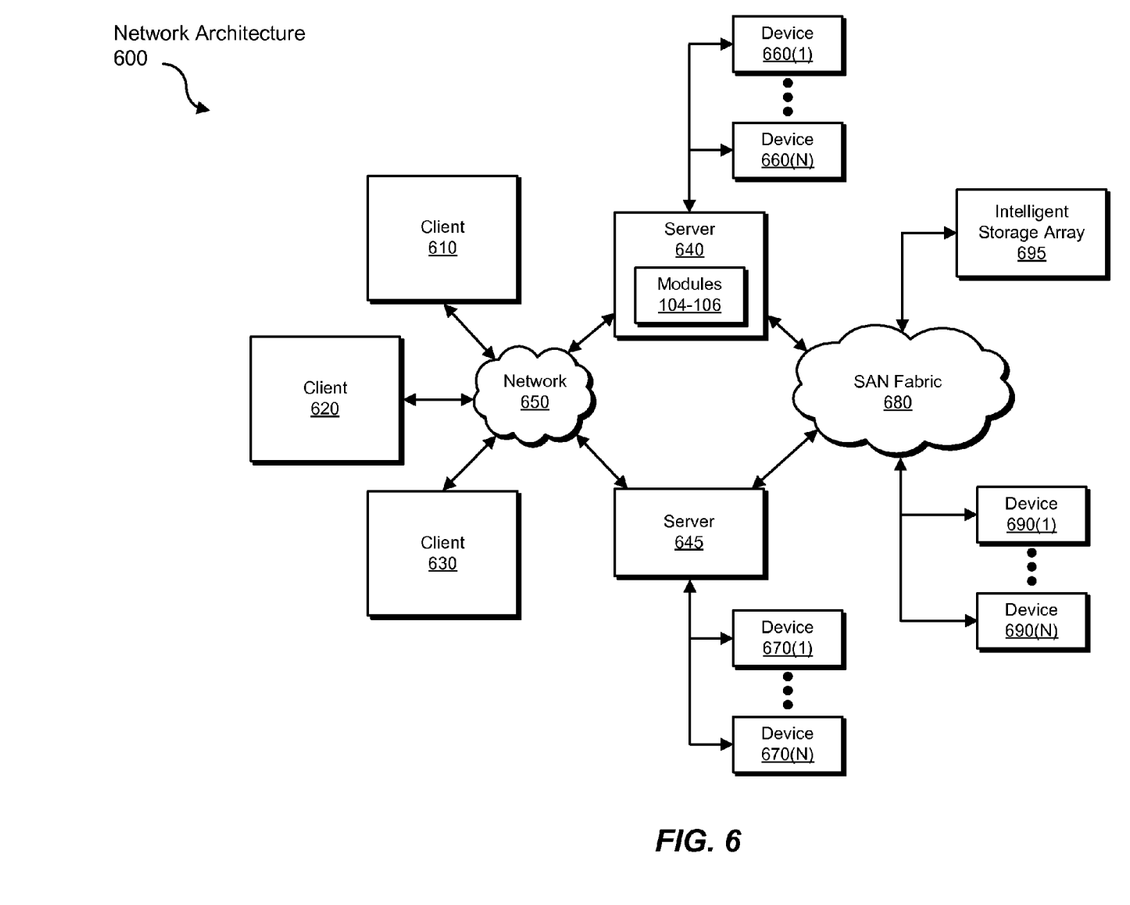
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the monitoring, detecting, identifying, determining, initiating, facilitating, restoring, searching, accessing, warning, enabling, copying, bringing, and replacing steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for proactively facilitating restoration of potential data failures.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a characteristic or property of one or more physical devices (such as computing device 202 and/or server 206) by proactively facilitating restoration of potential data failures.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for proactively facilitating restoration of potential data failures, at least a portion of the method being performed by a computing device comprising at least one processor, the method comprising:
    monitoring a computing system for evidence of potential data failures within the computing system;
    while monitoring the computing system, detecting evidence that indicates a potential data failure within the computing system by:
        identifying a file system located on the computing system;
        detecting at least one failed attempt to perform an input/output operation on at least a portion of data stored in the file system;
    identifying data implicated in the potential data failure based on the detected evidence;
    initiating an action configured to proactively facilitate restoration of at least a portion of the data implicated in the potential data failure in response to the detected evidence prior to making a determination as to whether the data implicated in the potential data failure needs to be restored.

2. The method of claim 1, wherein detecting the evidence that indicates the potential data failure within the computing system further comprises:
    identifying an application installed on the computing system;
    searching the computing system for evidence that indicates data corruption in at least a portion of data accessed by the application;
    while searching the computing system, detecting the evidence that indicates data corruption in the portion of data accessed by the application.

3. The method of claim 2, wherein detecting the evidence that indicates data corruption in the portion of data accessed by the application further comprises:
    identifying at least one event log that specifies at least one error detected in the computing system;
    searching the event log for an error that indicates that the portion of data accessed by the application is potentially corrupt;
    while searching the event log, identifying the error that indicates that the portion of data accessed by the application is potentially corrupt.

4. The method of claim 3, wherein the event log that specifies the errors detected in the computing system comprises at least one of:
    an event log maintained by an operating system installed on the computing system;
    an event log maintained by the application that accessed the portion of data that is potentially corrupt;
    an event log maintained by an administrator of the computing system.

5. The method of claim 1, wherein identifying the data implicated in the potential data failure based on the detected evidence comprises using a file system filter driver to:
    access the file system;
    detect the failed attempt to perform the input/output operation on the portion of data stored in the file system;
    detect an apparently successful attempt to perform the input/output operation on the portion of data in the file system after detecting the failed attempt to perform the input/output operation;
    identify the portion of data stored in the file system based on the input/output operation.

6. The method of claim 1, wherein the action configured to proactively facilitate restoration of the portion of the data comprises at least one of:
    warning a user of the computing system of the potential data failure to enable the user to determine whether to restore the data implicated in the potential data failure;
    replacing the data implicated in the potential data failure with a backup copy of the data implicated in the potential data failure;
    enabling a different computing system to access a backup copy of the data implicated in the potential data failure;
    bringing online a virtual machine that includes a backup copy of the data implicated in the potential data failure.

7. The method of claim 1, wherein initiating the action configured to proactively facilitate restoration of the portion of the data implicated in the potential data failure comprises:
    determining that a backup copy of the data implicated in the potential data failure is stored on a remote computing system;
    copying the backup copy of the data implicated in the potential data failure from the remote computing system to a local storage location on the computing system;
    facilitating replacement of the data implicated in the potential data failure with the backup copy upon determining that the data implicated in the potential data failure is no longer operable for at least one intended purpose of the data.

8. The method of claim 1, wherein initiating the action configured to proactively facilitate restoration of the portion of the data implicated in the potential data failure comprises:
    identifying a plurality of actions capable of proactively facilitating restoration of the portion of the data implicated in the potential data failure;
    identifying at least one of the actions based on the detected evidence;

initiating the identified action in response to the detected evidence.

9. The method of claim 1, wherein determining whether the data implicated in the potential data failure needs to be restored comprises determining whether the data implicated in the potential data failure is no longer operable for at least one intended purpose of the data.

10. The method of claim 1, wherein detecting the failed attempt to perform the input/output operation on the portion of data stored in the file system comprises:
   identifying a list that specifies defective data clusters;
   identifying, in the list, a data cluster that includes the portion of data stored in the file system;
   determining, based at least in part on identifying the data cluster in the list, that the portion of the data included in the data cluster is potentially corrupt.

11. The method of claim 10, wherein:
   the file system adds the data cluster to the list in response to the failed attempt to perform the input/output operation on the portion of data;
   after the file system adds the data cluster to the list in response to the failed attempt, the file system initiates an apparently successful attempt to perform the input/output operation on the portion of data;
   determining that the portion of data included in the data cluster is potentially corrupt comprises determining that the portion of data included in the data cluster is potentially corrupt despite the file system's apparently successful attempt to perform the input/output operation on the portion of data.

12. A system for proactively facilitating restoration of potential data failures, the system comprising:
   a monitoring module programmed to:
      monitor a computing system for evidence of potential data failures within the computing system;
      detect, while monitoring the computing system, evidence that indicates a potential data failure within the computing system by:
         identifying a file system located on the computing system;
         detecting at least one failed attempt to perform an input/output operation on at least a portion of data stored in the file system;
      identify data implicated in the potential data failure based on the detected evidence;
   a restoration module programmed to initiate an action configured to proactively facilitate restoration of at least a portion of the data implicated in the potential data failure in response to the detected evidence prior to making a determination as to whether the data implicated in the potential data failure needs to be restored;
   at least one processor configured to execute the monitoring module and the restoration module.

13. The system of claim 12, wherein the monitoring module is further programmed to:
   identify an application installed on the computing system;
   search the computing system for evidence that indicates data corruption in at least a portion of data accessed by the application;
   detect, while searching the computing system, the evidence that indicates data corruption in the portion of data accessed by the application.

14. The system of claim 13, wherein the monitoring module is further programmed to:
   identify at least one event log that specifies at least one error detected in the computing system;
   search the event log for an error that indicates that the portion of data accessed by the application is potentially corrupt;
   identify, while searching the event log, the error that indicates that the portion of data accessed by the application is potentially corrupt.

15. The system of claim 14, wherein the event log that specifies the error detected in the computing system comprises at least one of:
   an event log maintained by an operating system installed on the computing system;
   an event log maintained by the application that accessed the portion of data that is potentially corrupt;
   an event log maintained by an administrator of the computing system.

16. The system of claim 12, wherein the monitoring module is programmed to use a file system filter driver to:
   access the file system;
   detect the failed attempt to perform the input/output operation on the portion of data stored in the file system;
   detect an apparently successful attempt to perform the input/output operation on the portion of data in the file system after detecting the failed attempt to perform the input/output operation;
   identify the portion of data stored in the file system based on the input/output operation.

17. The system of claim 12, wherein the action configured to proactively facilitate restoration of the portion of the data comprises at least one of:
   warning a user of the computing system of the potential data failure to enable the user to determine whether to restore the data implicated in the potential data failure;
   replacing the data implicated in the potential data failure with a backup copy of the data implicated in the potential data failure;
   enabling a different computing system to access a backup copy of the data implicated in the potential data failure;
   bringing online a virtual machine that includes a backup copy of the data implicated in the potential data failure.

18. The system of claim 12, wherein the restoration module is programmed to:
   determine that a backup copy of the data implicated in the potential data failure is stored on a remote computing system;
   copy the backup copy of the data implicated in the potential data failure from the remote computing system to a local storage location on the computing system;
   facilitate replacement of the data implicated in the potential data failure with the backup copy upon determining that the data implicated in the potential data failure is no longer operable for at least one intended purpose of the data.

19. The system of claim 12, wherein the restoration module is programmed to:
   identify a plurality of actions configured to proactively facilitate restoration of the portion of the data implicated in the potential data failure;
   identify at least one of the actions based on the detected evidence;
   initiate the identified action in response to the detected evidence.

20. A non-transitory computer-readable-storage medium comprising one or more computer-executable instructions that, when executed by at least one processor of a computing device, cause the computing device to:
   monitor a computing system for evidence of potential data failures within the computing system;

detect, while monitoring the computing system, evidence that indicates a potential data failure within the computing system by:
  identifying a file system located on the computing system;
  detecting at least one failed attempt to perform an input/output operation on at least a portion of data stored in the file system;
identify data implicated in the potential data failure based on the detected evidence;
initiate an action configured to proactively facilitate restoration of at least a portion of the data implicated in the potential data failure in response to the detected evidence prior to making a determination as to whether the data implicated in the potential data failure needs to be restored.

* * * * *